(No Model.)
B. F. MARABLE.
SAW DRESSING DEVICE.
No. 568,782. Patented Oct. 6, 1896.
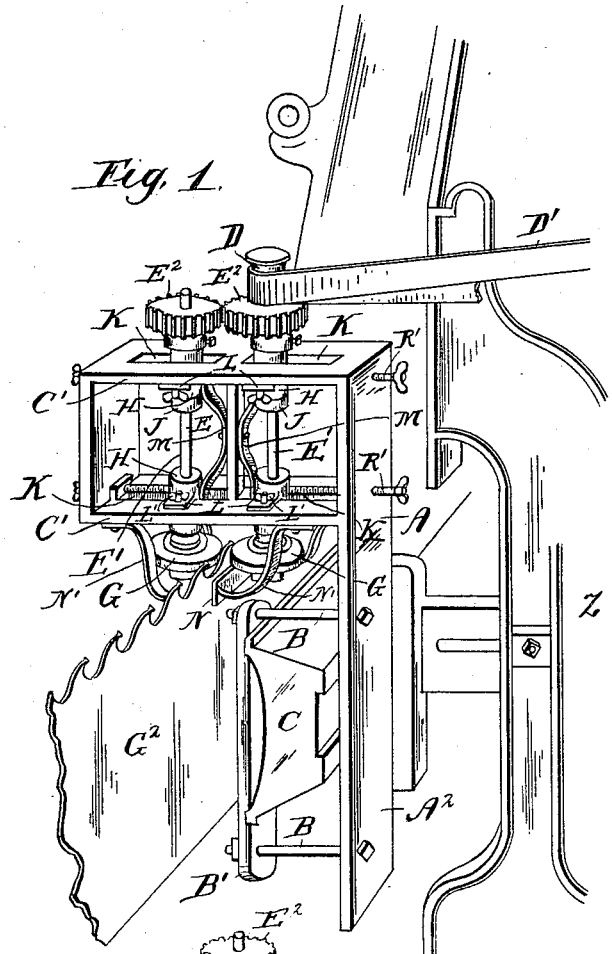
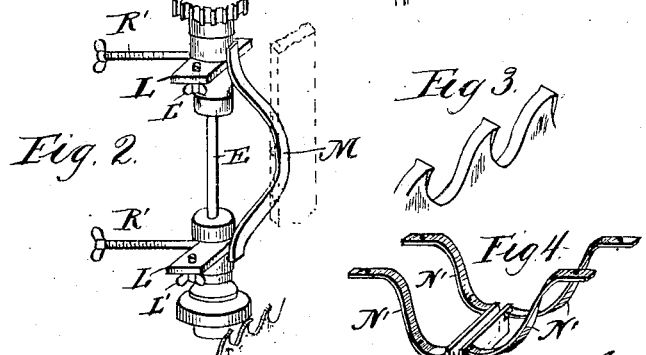
Witnesses:
L. C. Hills
J. D. Kingsbery
Inventor
Benjamin F. Marable
By Wm. E. Poulter,
Attorney.

UNITED STATES PATENT OFFICE.

BENJAMIN F. MARABLE, OF DUBUQUE, IOWA, ASSIGNOR OF ONE-HALF TO MICHAEL HANLEY, OF SAME PLACE.

SAW-DRESSING DEVICE.

SPECIFICATION forming part of Letters Patent No. 568,782, dated October 6, 1896.

Application filed January 8, 1896. Serial No. 574,746. (No model.)

*To all whom it may concern:*

Be it known that I, BENJAMIN F. MARABLE, a citizen of the United States, residing at Dubuque, in the county of Dubuque and State of Iowa, have invented certain new and useful Improvements in Saw-Dressing Devices; and I do declare the following to be a full, clear, and exact description of the invention, such as will enable others skilled in the art to which it appertains to make and use the same.

This invention has relation to machines or devices for side-dressing saw-teeth, and especially those of band-saws, said devices also being applicable for dressing or grinding the top joints or surfaces of the teeth.

Among the objects in view is to provide simple, inexpensive, and efficient devices whereby saw-teeth may be evenly and rapidly dressed or ground upon each side of the saw and upon their top surfaces, whereby the usual friction in operating the saw and waste of lumber are reduced, and irregularities in the dimensions of the pieces sawed prevented.

As heretofore practiced, the teeth of band-saws have been side-dressed and also top-dressed by special devices operated by hand and comprising a file for side-dressing and one for top-dressing, and when such devices have been applied to band-saws many irregularities and inequalities are produced, which it is impossible to avoid. This invention is designed to overcome these difficulties; and it consists in the novel construction, arrangement, and combination of parts as hereinafter fully described, illustrated in the drawings, and pointed out in the appended claims.

In the drawings, Figure 1 is a perspective view illustrating the device in its application to a band-saw for side-dressing the teeth thereof. Fig. 2 is a detail view illustrating the manner of top-dressing the teeth of a saw. Fig. 3 is an enlarged detail view of a portion of a band-saw, showing the formation of the teeth thereof. Fig. 4 is a detail perspective view of the clamping device for the saw.

In carrying out the invention I provide a suitable frame A, adapted to support the operative parts of the device, as presently described, which frame is adapted to be adjustably supported or secured to some suitable support whereby said frame may be raised or lowered for a purpose presently apparent. The support for the frame A may be a saw filer and gummer, as indicated at Z, (a portion only of the same being shown,) the same having a projecting portion C, to which is adapted to be clamped the frame A by means of clamping-bolts B and plate B', for instance. The horizontal ledges or portions C' of the frame are provided with alined slots K, and E E' indicate vertically-arranged shafts which pass through said slots and are provided with collars or boxes H, held in position by collars J and adapted to fit snugly within said slots and at the same time adapted to be adjusted laterally.

Upon the lower end of each shaft is rigidly mounted an emery or other suitable grinding-wheel G, the latter wheels being arranged opposite each other and adapted to permit a band-saw $G^2$ to be inserted between them, whereby said wheels may operate upon the sides of the teeth of the saw in the manner indicated in Fig. 1 of the drawings.

In order that the device may be applicable to saws of various thicknesses, the shafts E E' are adjustable laterally relatively to each other, as above explained, so that the emery-wheels may be brought closer to or farther from each other for the entrance of the saw between them.

For adjusting the shafts, I preferably employ screw-rods R', which work within the frame A and bear upon the boxes H, and in order that the shafts may be tightly held in any adjusted position the boxes H are each provided with laterally-projecting horizontal lugs L, which bear upon the opposing faces of the ledges C' of frame A and carry thumb-screws L'. Springs M act to normally press or force the shafts apart to thus resist inward movement of the shafts and hold the boxes firmly against the inner ends of the adjusting screw-rods while being adjusted.

N indicates clamps adapted to bear firmly against the saw upon each side thereof and preferably at points just below the emery-wheels and in close proximity to the teeth being ground, thus affording a firm bearing for the saw and assisting in the uniformity of the side-dressing. The clamps have supporting-arms N', which are bolted to the lower ledge of the frame A.

For operating the shafts and their emery-wheels I provide gear-wheels $E^2 E^2$ at the upper ends of the shafts, which wheels are in gear and adapted to be driven by a belt D' of the saw-gummer which passes around pulley D on the shaft E'.

When it is desired to dress the top surfaces of the saw-teeth, the frame A is simply raised sufficiently to bring an emery-wheel above the teeth and in position to act upon their top joints, as seen in Fig. 2.

As shown more clearly in Fig. 3, the band-saw upon which my invention is shown as operating has its teeth swaged to produce a wedge-shaped extension projecting from each side of the saw. In order that the described wedge-shaped extensions of the teeth may be properly ground, so as not to unduly wear them away, the teeth of the gear-wheels are made quite deep, permitting them and the shafts E E', by means of the upper adjusting-rods, to diverge from a vertical line, the emery-wheels at the same time inclining somewhat away from each other to correspond with the wedge shape of the teeth.

By constructing the portion $A^2$ of the frame A to partake of various inclinations the device may be applied to various constructions of filing and gumming machines.

It will be noted that by applying my device to a saw-gummer I can readily utilize the driving power thereof for the operation of my device, thus avoiding the necessity of providing additional or separate driving power and devices for the purpose of operating my invention. It will also be noted that by means of the described apparatus or device saw-teeth of various thicknesses may be uniformly and rapidly ground both upon their sides and top surfaces.

What I claim, and desire to secure by Letters Patent, is—

1. The herein-described device for use as set forth, comprising a supporting-frame having laterally-projecting portions provided with alined openings, rotatable shafts passing through said openings, grinding-wheels mounted upon the lower ends of the shafts, said lower ends of the shafts projecting below the lower laterally-projecting portion of the frame, and horizontally-arranged adjusting-rods working within the supporting-frame at opposite sides thereof, and projecting inwardly and adapted to effect lateral adjustment of the shafts, and means for locking the shafts in their adjusted positions, as described.

2. In a device of the character described the combination with a supporting-frame having laterally-projecting portions, and the rotatable shafts and the grinding-wheels thereon, of clamps having supporting-arms secured at one end to the lower laterally-projecting portion of the frame, and said arms being arranged upon each side of the grinding-wheels, said clamps being adapted to clamp a saw upon each side at points below said grinding-wheels in proximity to the teeth of the saw, all as described.

3. The herein-described device for use as set forth comprising a supporting-frame and a depending portion adapted to be adjustably clamped to a support as described, the horizontal portions of said frame having alined openings, rotatable shafts passing through said openings, grinding-wheels on the shafts, boxes also on the shafts, lugs carried by the boxes and adapted to be secured to the horizontal portions of the frame, adjusting-rods for effecting lateral adjustment of the shafts, springs bearing upon the boxes and adapted to resist inward movement of the shafts, gear-wheels carried by the upper ends of the shafts and in gear with each other, and a pulley on one of the shafts, as specified.

In testimony whereof I affix my signature in presence of two witnesses.

BENJAMIN F. MARABLE.

Witnesses:
J. A. GLEASON,
JOHN HAWE.